United States Patent
Simpson et al.

(10) Patent No.: US 7,519,575 B1
(45) Date of Patent: Apr. 14, 2009

(54) METHOD AND APPARATUS FOR PRESENTING, SEARCHING, AND VIEWING DIRECTORIES

(75) Inventors: Michel Shane Simpson, Orem, UT (US); Brett Dee Garrett, Orem, UT (US); Nathan Blaine Jensen, Spanish Fork, UT (US); William Donald Peterson, III, Provo, UT (US)

(73) Assignee: Novell, Inc., Provo, UT (US)

( * ) Notice: Subject to any disclaimer, the term of this patent is extended or adjusted under 35 U.S.C. 154(b) by 638 days.

(21) Appl. No.: 09/943,786

(22) Filed: Aug. 31, 2001

(51) Int. Cl.
*G06F 7/00* (2006.01)
*G06F 17/00* (2006.01)

(52) U.S. Cl. .......................... 707/3; 707/100; 707/102; 707/104.1; 707/10; 709/217; 709/218; 709/219

(58) Field of Classification Search .......... 707/1–104.1; 709/203, 213, 225, 217–219, 223, 226
See application file for complete search history.

(56) References Cited

U.S. PATENT DOCUMENTS

| | | | | |
|---|---|---|---|---|
| 5,491,817 A | * | 2/1996 | Gopal et al. | 707/200 |
| 5,758,434 A | * | 6/1998 | Gipson | 34/340 |
| 5,983,234 A | * | 11/1999 | Tietjen et al. | 707/103 R |
| 6,085,030 A | * | 7/2000 | Whitehead et al. | 709/203 |
| 6,119,122 A | * | 9/2000 | Bunnell | 707/102 |
| 6,131,120 A | * | 10/2000 | Reid | 709/225 |
| 6,173,283 B1 | * | 1/2001 | Kasso et al. | 707/10 |
| 6,192,362 B1 | * | 2/2001 | Schneck et al. | 707/10 |
| 6,195,666 B1 | * | 2/2001 | Schneck et al. | 707/10 |
| 6,208,986 B1 | * | 3/2001 | Schneck et al. | 707/3 |
| 6,209,036 B1 | * | 3/2001 | Aldred et al. | 709/229 |
| 6,212,558 B1 | * | 4/2001 | Antur et al. | 709/221 |
| 6,243,815 B1 | * | 6/2001 | Antur et al. | 709/220 |
| 6,260,039 B1 | * | 7/2001 | Schneck et al. | 707/10 |
| 6,286,010 B1 | * | 9/2001 | Ramachandran et al. | 707/103 R |
| 6,345,266 B1 | * | 2/2002 | Ganguly et al. | 707/2 |
| 6,360,230 B1 | * | 3/2002 | Chan et al. | 707/103 R |
| 6,366,954 B1 | * | 4/2002 | Traversat et al. | 707/104.1 |
| 6,389,589 B1 | * | 5/2002 | Mishra et al. | 717/170 |
| 6,408,306 B1 | * | 6/2002 | Byrne et al. | 707/104.1 |
| 6,470,332 B1 | * | 10/2002 | Weschler | 707/3 |
| 6,484,177 B1 | * | 11/2002 | Van Huben et al. | 707/10 |
| 6,490,619 B1 | * | 12/2002 | Byrne et al. | 707/3 |

(Continued)

OTHER PUBLICATIONS

Dave Kosiur—"LDAP: The next-generation directory?" Source: http://www.sunworld.com/swol-10-1996/f_swol-10-ldap.html (pp. 1-7).*

(Continued)

*Primary Examiner*—John E Breene
*Assistant Examiner*—Anh Ly
(74) *Attorney, Agent, or Firm*—King & Schickli PLLC

(57) ABSTRACT

A directory shell references one or more directories. Each directory comprises a plurality of directory objects each having object attributes and attribute data. One or more categories in the directory shell are associated with one or more directory objects and at least a portion of the associated object attribute. A user interface is operable for a user to query the categories in the directory shell. A directory interface is operable to send a search request to the directories in accordance with the query and receive data from the directories that satisfy the search request.

15 Claims, 10 Drawing Sheets

U.S. PATENT DOCUMENTS

| | | | | |
|---|---|---|---|---|
| 6,501,491 | B1* | 12/2002 | Brown et al. | 707/10 |
| 6,513,038 | B1* | 1/2003 | Hasegawa et al. | 707/7 |
| 6,587,856 | B1* | 7/2003 | Srinivasan et al. | 707/102 |
| 6,609,121 | B1* | 8/2003 | Ambrosini et al. | 707/3 |
| 6,629,132 | B1* | 9/2003 | Ganguly et al. | 709/213 |
| 6,708,170 | B1* | 3/2004 | Byrne et al. | 707/9 |
| 6,732,160 | B2* | 5/2004 | Ambrosini et al. | 709/218 |
| 6,757,720 | B1* | 6/2004 | Weschler, Jr. | 707/10 |
| 6,769,011 | B1* | 7/2004 | Desrochers et al. | 709/203 |
| 6,883,036 | B1* | 4/2005 | Barrett | 707/204 |
| 6,947,953 | B2* | 9/2005 | Herzenberg et al. | 707/104.1 |
| 6,980,985 | B1* | 12/2005 | Amer-Yahia et al. | 707/4 |
| 7,016,945 | B2* | 3/2006 | Bellaton et al. | 709/219 |
| 7,043,472 | B2* | 5/2006 | Aridor et al. | 707/3 |
| 7,051,114 | B1* | 5/2006 | Ravishankar et al. | 709/245 |
| 7,130,880 | B1* | 10/2006 | Burton et al. | 709/203 |
| 2001/0034733 | A1* | 10/2001 | Prompt et al. | 707/102 |
| 2001/0039549 | A1* | 11/2001 | Eng et al. | 707/100 |
| 2002/0032775 | A1* | 3/2002 | Venkataramaiah et al. | 709/225 |
| 2002/0188729 | A1* | 12/2002 | Zhou et al. | 709/227 |
| 2002/0198869 | A1* | 12/2002 | Barnett | 707/3 |
| 2003/0078937 | A1* | 4/2003 | Boreham et al. | 707/102 |
| 2003/0191757 | A1* | 10/2003 | Ambrosini et al. | 707/3 |
| 2003/0212863 | A1* | 11/2003 | Ganguly et al. | 711/118 |
| 2004/0215600 | A1* | 10/2004 | Aridor et al. | 707/3 |
| 2005/0273459 | A1* | 12/2005 | Moore et al. | 707/1 |
| 2005/0273475 | A1* | 12/2005 | Herzenberg et al. | 707/200 |
| 2006/0129652 | A1* | 6/2006 | Petrovskaya | 709/208 |
| 2006/0173873 | A1* | 8/2006 | Prompt et al. | 707/100 |
| 2006/0195575 | A1* | 8/2006 | Delany et al. | 709/225 |

OTHER PUBLICATIONS

"Directory-Enabled Networking Design Reference"—Curtis M. Keliiaa—Sandia National Laboratories—Sandia Report SAND2000-3007 Dec. 2000 (pp. 1-117).*

"Integrating Network Devices in Meta-Directory: The MetaComm Experience"—Juliaka Freire, Daniel Lieuwen, and Joann Ordille—Information Systems, vol. 19, No. 1, 1994 (pp. 1-24).*

"RFC2798", M. Smith, Apr. 2000.

"What is Novel eGuide", Novell Inc., May 10, 2001.

"Novell eGuide 1.5, Quick Look", Novell Inc., printed on Aug. 31, 2001.

"Novell eGuide 1.5 Detailed View", Novell, Inc., printed on Aug. 31, 2001.

"Novell eGuide, Administrator Guide", Novell Inc., Feb. 2000.

http://www.calendra.com/us/_print/products/products_us.htm printed on Oct. 23, 2001.

http://www.calendra.com/us/_print/products/mobile_us.htm printed on Oct. 23, 2001.

http://www.calendra.com/us/_print/products/description_innov_us.htm printed on Oct. 23, 2001.

http://www.calendra.com/us/_print/products/appli_people_us.htm printed on Oct. 23, 2001.

http://www.calendra.com/us/_print/products/demonstrations_us.htm printed on Oct. 23, 2001.

http://www.calendra.com/us/_print/products/version2_1_us.htm printed on Oct. 23, 2001.

http://www.calendra.com/us/_print/products/LDAP_us.htm printed on Oct. 23, 2001.

http://www.calendra.com/us/_print/press/version2_us.htm printed on Oct. 23, 2001.

htp://www.calendra.com/us/_print/press/funds2_us.htm printed on Oct. 23, 2001.

"Administration and Design Guide" Calendra Directory Manager Version 2.1 copyright 2001 Calendra.

* cited by examiner

METHOD AND APPARATUS FOR PRESENTING, SEARCHING, AND VIEWING DIRECTORIES

COPYRIGHTS PRESERVED

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to computer systems and software, and will be specifically disclosed as a method and apparatus for presenting, searching, and viewing directories.

BACKGROUND

The virtual explosion of technical advances in microelectronics, digital computers and software have changed the face of modern society. In fact, these technical advances have become so important and pervasive that this explosion is sometimes referred to as "The Information Revolution." Through telephone lines, networks, satellite communications and the like, information and resources are ever increasingly being accessed and shared.

One mechanism used to organize, store, search, edit, and retrieve information and resources on a computer is through a directory. A directory contains a collection of objects, sometimes referred to as identities, with associated attributes or properties. For example, an directory object could be a User object that represents a human user. Beyond representing users, objects can represent things that humans relate to when dealing with computers. For instance, some typical objects might represent printers, print queues, files, resources, computers, and the like. In addition, objects can represent non-computer related things such as countries, companies, organizations, departments, buildings, and the like. Furthermore, objects can be organizational in nature to group other objects together. As one with ordinary skill in the art will readily appreciate, objects can represent virtually anything, whether imaginary or real.

A directory object has a variety of associated attributes. For instance, a user object may have attributes such as Given Name, Last Name, Title, Location, Telephone Number, Description, Authentication, Login Name, etc. In most cases, an object attribute will have associated attribute data. For example, the value for the attribute "Given Name" might be "George". An attribute is usually based on an attribute type, which has an attribute syntax. The data which can be entered as a value associated with the attribute is dictated by the attribute syntax. For instance, some typical attribute types include Back Link, Boolean, Case Exact String, Case Ignore List, Case Ignore String, Class Name, Counter, Distinguished Name, E-mail Address, Facsimile Telephone Number, Hold, Integer, Interval, Net Address, Numeric String, Object ACL, Octet List, Octet String, Path, Postal Address, Printable String, Replica Pointer, Stream, Telephone Number, Time, Timestamp, Typed Name, and Unknown. Each of these attribute types has a predetermined attribute syntax or data structure appropriate for the type of data that will be entered as a value.

In many cases, the structure of a directory is governed by a schema. The schema defines the rules for adding and managing objects and object attributes in a directory. For instance, a schema can be specified through a data dictionary that provides a standard set of data types or classes from which objects can be created. In such a case, each object in the directory belongs to a class that specifies which attributes are associated with the object. In other words, an object is of a particular type and is created from a corresponding class. For example, a User object would be created from a User class, a Printer object would be created from a Printer class, etc. An object created from a class is sometimes referred to as being "instantiated" from the class, wherein the object is referred to as an "instance" of the class. Generally, such schemas are extensible so that they may be tailored to modify existing classes or add new classes.

Beyond controlling the structure of the directory objects, the schema may also control the relationship among the objects in the directory. In controlling this relationship, the schema may specify subordination among object classes. For instance, for every object there can be a group of classes from which subordinate objects can be formed. Objects that contain other objects are called container objects, which are the building blocks of the hierarchal relationship of objects in the directory. Objects that cannot contain other objects are known as non-container or leaf objects. As such, the combination of container and leaf objects can be arranged in a tree-like structure representing the hierarchal relationship of the various objects. Directories that include such schemas are sometime referred to as hierarchal directories.

There are a variety of types, formats and standards for directories. For example, some directories are compliant with the Lightweight Directory Access Protocol ("LDAP"). LDAP is a protocol used to access a directory. One common use for LDAP compliant directories is in conjunction with Web browsers and e-mail programs, however, LDAP directories are used in a variety of other applications as well. Another example is X.500 directories, which are hierarchal directories that use the Directory Access Protocol ("DAP") to access such directories. Beyond these two limited examples, a variety of other types of directories are currently known to one with ordinary skill in the art. Moreover, additional types of directories will undoubtably emerge in the future. Some current examples of directories include Novell Directory Services "NDS", Novell's eDirectory, Oracle Databases, Netscape's Directory Server and Planet Directory Server, Microsoft's Active Directory, IBM's SecureWay Directory.

Sometimes, the directories on various computers are coordinated to provide a larger directory, which is sometimes referred to as a distributed directory. Generally speaking, a distributed directory spans and is shared by multiple networked servers wherein the objects in the directory are synchronized between the various servers, although a single server can also maintain a distributed directory. While distributed directories are often used with client/server networks, they are not necessarily limited to the context of such networks. Information on the distributed directory can be created, read, modified, and shared by other networked nodes, such as client computers or other servers, assuming such nodes have appropriate access rights to the distributed directory.

SUMMARY

One aspect of the present invention is a computer system. One or more directories are accessible by a computer. The directories comprise a plurality of directory objects wherein each object has object attributes and attribute data. A directory shell references the directories and has one or more categories. Each of the categories is associated with one or more directory objects and at least a portion of the associated object attributes. A user interface is operable for a user to query the categories in the directory shell. A directory interface is operable to send a search request to the directories in accordance with the query and receive attribute data from the directories satisfying the search request.

Another aspect of the present invention is a method in a computer system. A directory shell is created comprising one or more categories. The directory shell is associated with one or more directories wherein each directory comprises a plurality of directory objects having object attributes and attribute data. Each of the categories is associated with one or more directory objects and at least a portion of the object attributes corresponding to the directory objects. A search is requested for query data against a selected category. The directories are searched for the query data against the attribute data corresponding to the directory objects and object attributes associated with the selected category. Attribute data satisfying the search is received and presented.

Yet another aspect of the present invention is a data structure. One or more directories each comprise a plurality of classes with attributes and a plurality of objects instantiated from the classes. The instantiated objects comprise data associated with the attributes. A directory shell is associated with the directories. A plurality of categories are associated with the directory shell wherein each category corresponds to one or more classes in the directories. A plurality of category attributes are associated with each category wherein each category attribute corresponds to an attribute of the class of the associated class. The directory shell is queryable against the categories and category attributes to search and retrieve data of the objects in the directories.

Still other aspects of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several examples of the present invention and, together with their descriptions, serve to illustrate aspects of the invention. Like numerals indicate the same element throughout the views. In the drawings.

DETAILED DESCRIPTION

Figure 1:
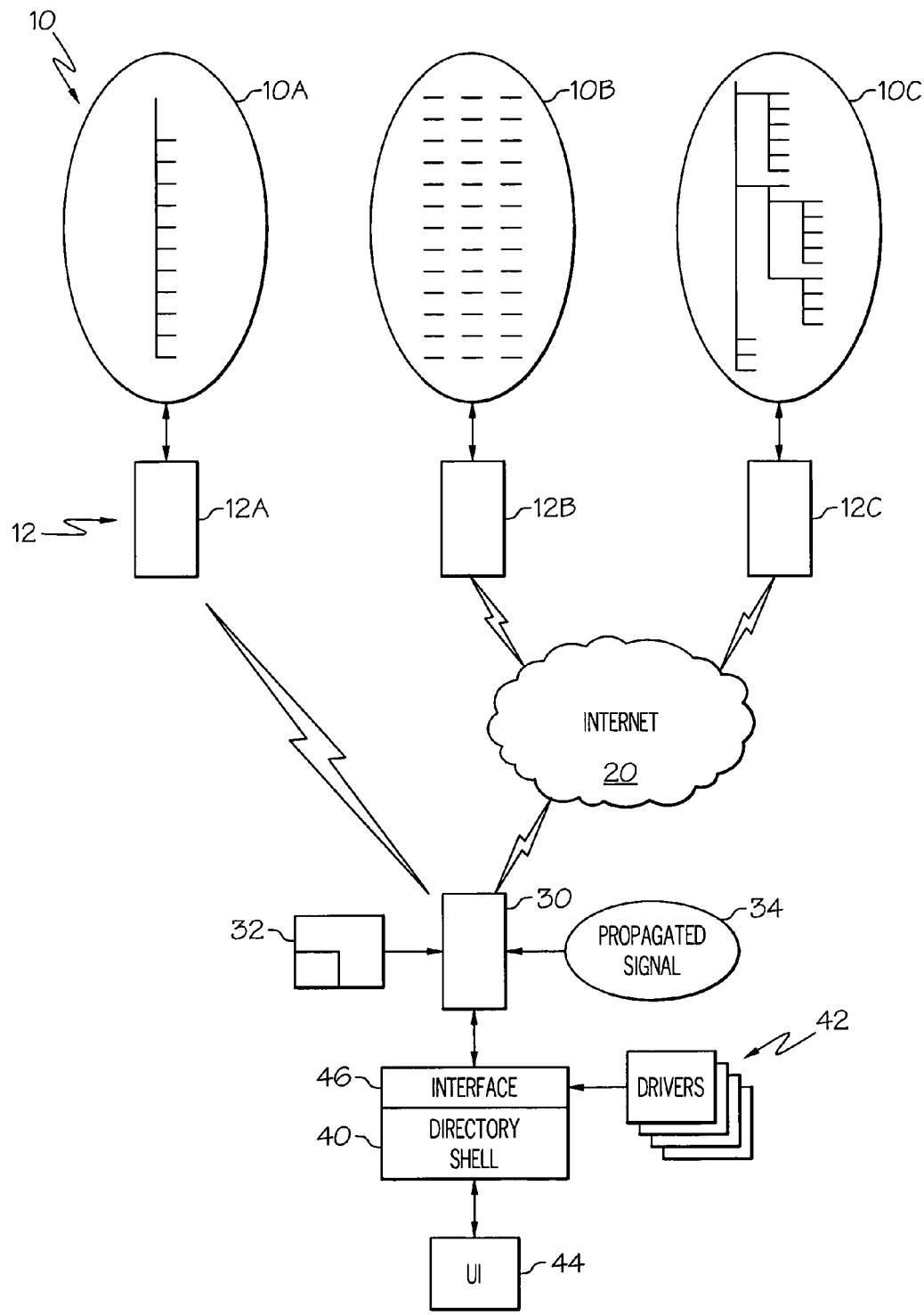
FIG. 1 depicts an example of a computer system, and more particularly the relationship between a directory shell and a plurality of directories.

FIG. 1 illustrates an example of a computer system of the present invention. As shown in this example, the directories 10a, 10b, and 10c are each maintained by directory servers 12a, 12b, and 12c, respectively. While three directories 10 are illustrated in this example, the invention could also be used with a single directory or with many more than three directories. Further, invention could be used in conjunction with any type of directory, distributed or otherwise, which could be maintained on a single or multiple servers. In addition, the invention is not limited to servers maintaining directories, as any computer or node that maintains or accesses a directory could also be employed. The directory servers 12 in this example communicate with the computer 30. The directory server 12a is directly connected to the computer 30, such as on a local area network "LAN", wide area network "WAN", peer-to-peer connection, or other ways known in the art, or possibly be one in the same as the computer 30. The directory servers 12b and 12c communicate with the computer 30 over the Internet 20. As one with ordinary skill in the art will readily recognize, the directory servers 12 can communicate with the computer 30 using a variety of different mechanisms, formats, and protocols.

The computer 30 can receive data and instructions to operate computer 30 (often referred to as programs or applications) in a variety of different ways. Two examples are illustrated. The computer readable medium 32, shown here as a floppy diskette, holds information readable by a computer 30, such as programs, instructions, data, files, etc. As one with ordinary skill in the art will readily appreciate, computer readable medium can take a variety of forms, including magnetic storage (such as hard disk drives, floppy diskettes, etc.), optical storage (such as laser discs "LD", compact discs "CD", digital versatile discs "DVD", etc.), electronic storage (such as random access memory "RAM", read only memory "ROM", programmable read only memory "PROM", flash memory, etc.), and the like. Certain types of computer readable medium, which are sometimes described as being non-volatile, can retain data in the absence of power so that the information is available when power is restored. The propogated signal 34 is a frequency transmission that contains data and instructions understandable to the computer 30. Some typical examples of propagated signals include electrical pulses transmitted over telephone lines or network cables, optical signals such as infrared, radio or microwave frequencies, originating from towers or satellites, and the like.

A directory shell application 40 runs on the computer 30, which, for example, may have been received by the computer 30 on a computer readable medium 32 or propagated signal 34. The directory shell 40 includes references to the directories 10 and includes one or more categories. Each category is associated with one or more objects in the directories 10. The categories may also be associated with all or a subset of the object attributes in the directories 10. A directory interface 46 formats, submits, and receives data to/from the directories 10. As different directories have different protocols, it is preferred that the directories 10 each be LDAP compliant, however, if a given directory 10 is not LDAP compliant, the directory drivers 42 can provide the necessary format/protocol information so that the directory interface 46 can communicate with such directory. A user interface 44 allows a user to view, search and interact with the directories 10. For instance, the user interface 44 could allow the user to format a query directed to objects in the directories 10 and present the object data that satisfy the query. Preferably, such queries are formatted against the categories. The user interface 44 could take a variety of forms known as the art, including an application device (e.g. cell phone, personal digital assistant "PDA", and the like), applet, servlet, function in a library, hypertext makeup language, extensible makeup language, wireless makeup language, dynamic hypertext makeup language, and the like. Further, the user interface 44 can operate on any device receiving wired or wireless data, including workstations, PDA's, cell phones, computers, and the like. The directory interface 46, directory shell 40, and user interface 44 can be an integrated set of instructions, a separate module of instructions, part of a library of instructions, any combination of the foregoing, or in other formats known in the art.

Figure 2:
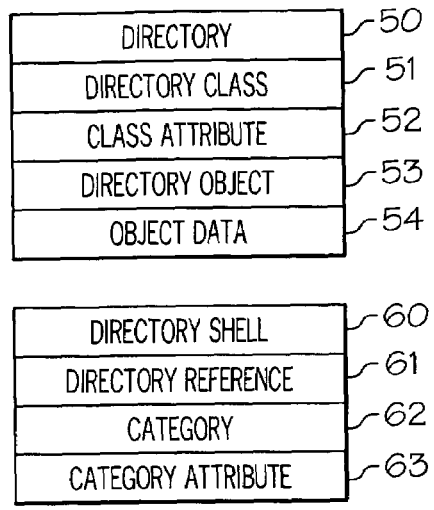
FIG. 2 illustrates an example of a data structures for a directory and a directory shell.

FIG. 2 illustrates an example of data structures for a directory 50 and a directory shell 60. One or more directories 50 each have a plurality of directory objects 53. In the present example, the directory objects 53 are instantiated from directory classes 51. Each directory class 51 has a plurality of class attributes 52. When an directory object 53 is instantiated, the directory object 53 will contain the class attributes 52 corresponding to the directory class 51 from which the directory object 53 was instantiated. Object data 54 populates the class attributes 52 of an instantiated directory object 53. It should be noted that the foregoing data structure of a directory 50 is only an example, and other structures are also contemplated. For instance, a directory object 53 could be created independent of a directory class 51, and nevertheless have its own set of attributes.

The directory shell 60 comprises one or more directory references 61. Each directory reference 61 is associated with a directory 50 and can include a variety of data specific to the directory 50. The directory references 61 identify which directories the directory shell 60 will access. The directory shell 60 also includes a collection of categories 62. Preferably, each directory reference 61 has its own unique set of associated categories 62. A category 62 represents and references one or more directory classes 51 that have been grouped together under one category name. In other words, any given category 62 is a collection of directory classes 51 and the directory objects 53 instantiated from such directory classes 51. A category 62 can reference classes 51 in a single directory or classes of different directories. For instance, a category called "Find People" can be configured to search only the Novell directory for objects instantiated from a User directory class. In another example, a category called "Cisco People" can be configured to search only the Cisco directory for User objects. In another example, a category called "Find All" can be configured to search both the Novell and Cisco directories for User objects. As one with ordinary skill in the art will recognize, the combinations and flexibility of categories 62 are virtually unlimited.

Each category 62 includes one or more category attributes 63. Each category attribute 63 is associated with or references (sometimes referred to as mapped) a class attribute 52 in the directory 50. However, every class attribute 52 does not need to be mapped to a category attribute 63. Accordingly, the category attributes 63 for a given category 62 are totally configurable to reference any class attribute 52 in the corresponding directory class 51. Optionally, the mapping between category attributes 63 and class attributes 52 can be predefined based on a library of standard categories 62. For instance, a standard "user" category in such a library would automatically map the category attributes to the class attributes Lastname, Firstname, and Organization of the User directory class.

Figure 3:
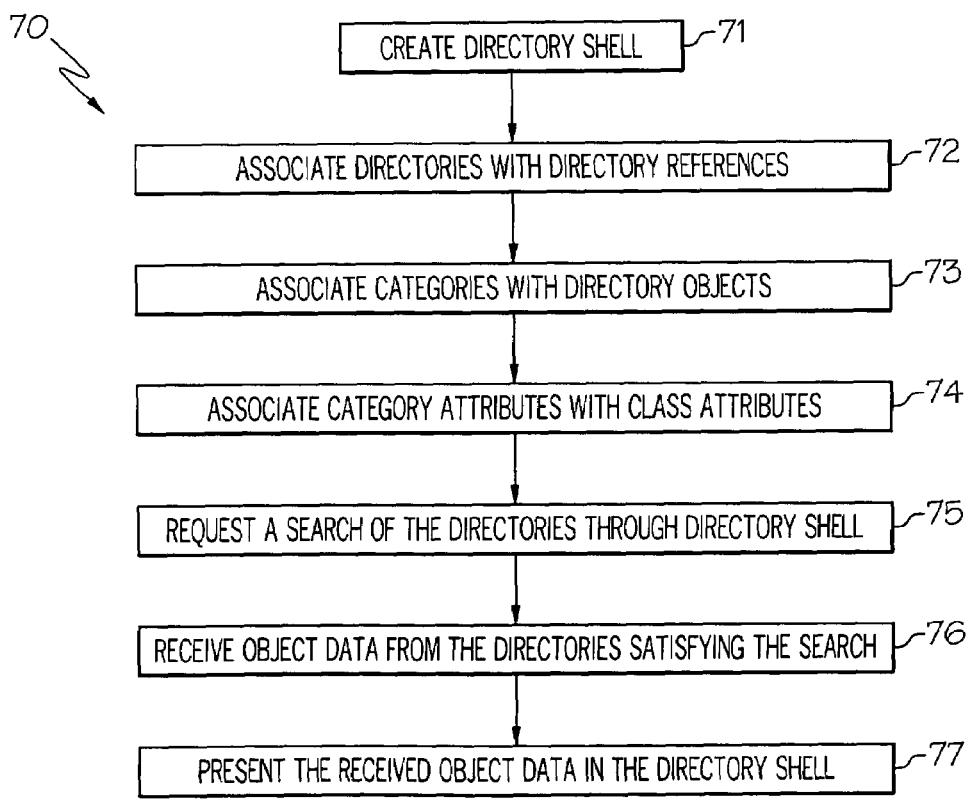
FIG. 3 illustrates an example of a flow chart of a method for using such data structures.

FIG. 3 illustrates a method 70 utilizing the data structures 50 and 60. At step 71, a directory shell 60 is created. At step 72, one or more directories 50 are associated with the directory shell 60. For instance, a directory reference 61 can be created for each directory 50 associated with the directory shell 60. During step 73, a plurality of categories 62 are associated with directory objects 53. For instance, each category 62 could reference one or more directory classes 51 such that directory objects 53 instantiated from such directory classes 51 are associated to the category 62. At step 74, category attributes 63 are associated or mapped to object attributes, such as to the class attributes 52, which are included in an instantiated directory object 53. At step 75, a search request is sent to the directory 50 based on the categories 62 and category attributes 63 for the corresponding directory reference 61. For instance, a query can be formatted such that query data is matched against a selected category and the category attributes. In such an instance, the category may be referred to as a search object. The formatted query could then be translated to search for the query data against the directory objects in the directory that corresponds to the selected category. Function calls using LDAP may be employed to transmit the request to the directory, assuming the directory is LDAP compliant. In another example, function calls could be prepared in accordance with appropriate directory drivers. The directory 50 replies to the search request and object data 54 satisfying the search is returned to the directory shell 60 during step 76. At step 77, the received object data 54 is presented, preferably in a user interface associated with the directory shell 60. It should be noted that the sequence of the steps in method 70 are presented as an illustration and the sequence may be varied.

By way of example, the following illustrates a data structure created from Java classes, wherein an instantiated class becomes an object from that class. Each Java class comprises data members and method members.

Schemer Class—This is a utility class that dynamically builds an internal table of DirectoryScheme objects that can be referenced by name through its API's.

DirectoryScheme Class—Each instance of this class corresponds to a single directory reference. This class is a top-level class that contains directory information to which an instance of the class is associated. This class also contains a table of all ObjectScheme objects for this directory reference. All contained ObjectScheme objects can be requested by name through API's of a DirectoryScheme object.

ObjectScheme Class—Each instance of this class corresponds to a category. This class contains a table of all directory classes associated with this category. This class also contains a table for all AttributeScheme objects and their association with directory classes that are associated with the ObjectScheme object.

AttributeScheme Class—Each instance of this class corresponds to an category attribute. This class contains a table of all administrator settings and schema data for a class attribute. All data contained in this object is available through API's.

AttributeSchemaReader Class—This is a utility class that builds one AttributeSchemaTableEntry object per class attribute of a given directory. This class builds a dynamic list of class attribute data that is made available through public API's.

AttributeSchemaTableEntry Class—This class contains schema information in a given class attribute and is intended to be a data member of the AttributeScheme class, where API's expose the contained data.

Naturally, the foregoing Java class structure is illustrative and a variety of other object oriented class structures, as well as other data and method structures, are contemplated. As one with ordinary skill in the art will readily recognize, many alternatives and variations may be employed.

In one example, a directory shell, which operates in conjunction with the foregoing Java class structure, is used in conjunction with Novell's eGuide product. This example of a directory shell includes two aspects: an administration utility and a directory browser. The administration utility is generally used by system administrators to configure and manage the directory shell. The directory browser, is typically used by end users to search and view directories, and if appropriate rights are granted, modify the directory. In the present example, the user interface for both aspects of the directory shell are generated by servlets and are presented in hypertext markup language ("HTML") and viewed in a standard browser, however, a variety of alternative user interfaces and variations are also contemplated, such as stand alone applications, applets, wireless devices, and the like.

Figure 4:
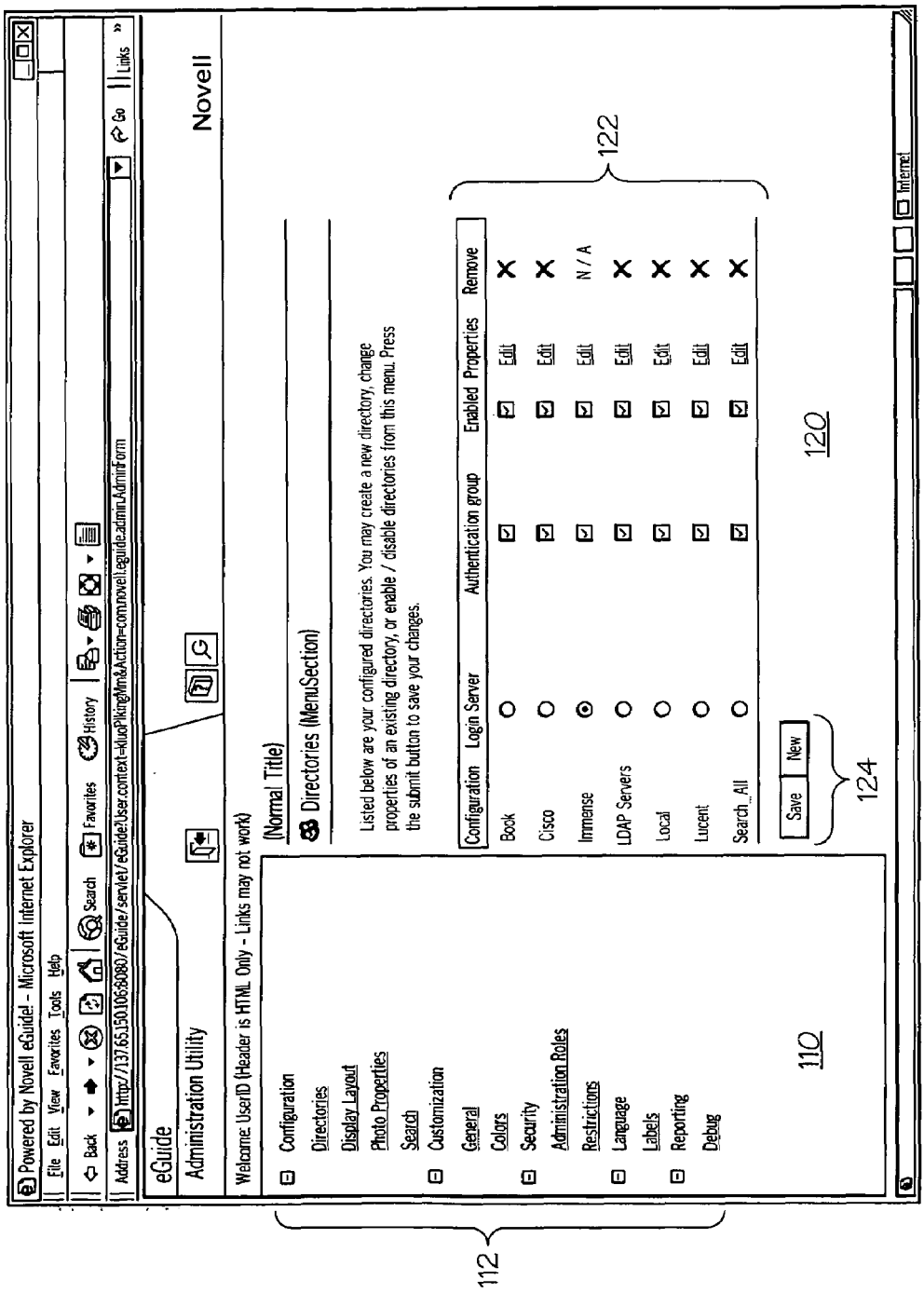
FIG. 4 depicts an example of a screen shot of the directories option of an administration utility.

FIG. 4 illustrates a page 100 associated with an administration utility. As shown in this example, the page 100 generally comprises two portions: an options panel 110 and a details panel 120. The options panel 110 comprises a list of a variety of options 112. In the present example, the options 112 are organized into 5 groups (i.e. Configurations, Customization, Security, Language, and Reporting). Each option 112 is a hyperlink that will update the page 100, wherein the options panel 110 will remain unchanged and the details panel 120 will change in accordance to the selected option 112.

The details panel 120 in the present figure corresponds to the Directories option 112 (i.e. the "Directories panel"). Using this panel 120, an administrator may add new directory references to a directory shell, change properties of a existing directory reference in the directory shell, or enable/disable directory references. The Directories panel 120 provides a table 122 listing various directory references in the directory shell. In the present example, each row of the table 122 corresponds to a DirectoryScheme object. The Configuration column in the table 122 corresponds to the name of the DirectoryScheme objects. The Login Server column provides a radio button for each row to identify the server to which the directory shell authenticates. In the present example, only one server may be selected, however, it is contemplated that the directory shell could authenticate to more than one server.

The Authentication Group column of the table 122 provides a check box for each row. The Authentication Group functionality breaks one large directory down into multiple, smaller directories for quicker search results. For example, each DirectoryScheme object could point to a different search base in the same directory, thus utilizing a multi-threaded search capability, such as that found in Novell's eGuide. Setting a DirectoryScheme object as a member of the Authentication Group designates that directory to be searched with the user's authenticated credentials verses its default proxy credentials. Any directory residing outside of the Authentication Group will consume proxy credentials on searches. Preferably, a directory would be designated as a member of the Authentication Group only when the distinguished name ("DN") and passwords of the user are applicable in both the Login Server and the intended directory. A user will have the ability to modify "Editable" attributes as long as they reside on the Login Server or on a directory that is an Authentication Group member.

One advantage of the Authentication Group functionality is that it utilizes a user's credentials for LDAP queries (inside the Authentication Group), thus utilizing the Access Control List ("ACL"). In regard to consuming the ACL, critical information can easily be protected and controlled through directory rights. Directories containing "general" or "non-critical" information can simply be excluded from the Authentication Group, where proxy credentials will be sufficient for viewing its data. This provides many different powerful business-to-business solutions.

The Enabled column of the table 122 provides a check box for each row, thus allowing an administrator to disable or enable searching on a directory. The Properties column provides a link to enable the administrator to edit the DirectoryScheme object. Upon selection of the link, the page 100 will be updated to present the Directories Edit panel 130 (shown in FIG. 5, discussed below). The Remove column in the table 122 allows an administrator to remove an DirectoryScheme object from the directory shell by selecting "X" in the associated row. Preferably, a user is prevented from removing the login server.

The Directories panel 120 includes two buttons 124. The Save button saves an changes entered in the table 122. The New button will create a new instance of the DirectoryScheme class, thus adding a new directory reference to the directory shell. Upon selection, the page 100 will be updated to display the Directories Edit panel 130. After creation, this new DirectoryScheme object will be added to the table 122.

Figure 5:
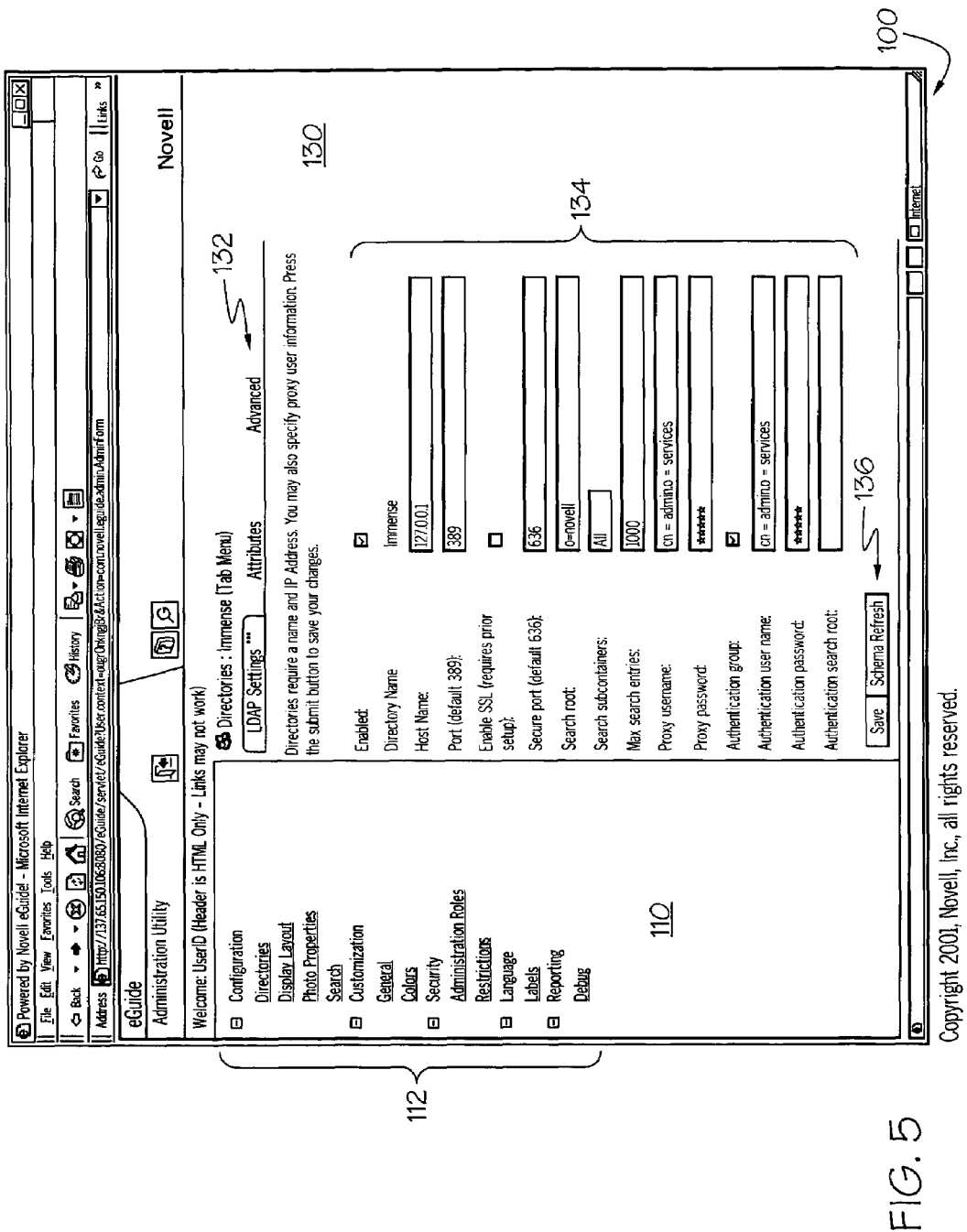
FIG. 5 depicts an example of a screen shot of the LDAP settings tab for the directories option of an administration utility.

Turning now to FIG. 5, the page 100 comprises an example of a Directories Edit panel 130. The panel 130 includes three tabs 132 (i.e. LDAP Settings, Attributes, and Advanced), each corresponding to a separate view of the panel 130. The default view for the Directories Edit panel 130 is the LDAP Settings view, as illustrated here. The LDAP Settings view comprises a variety of fields 134 relating to the configuration of the directory that a DirectoryScheme object represents. The Enabled field specifies if Directory is "Searchable." The Name field is used as an identifier for the DirectoryScheme object. If a new DirectoryScheme object is being created, the field will be editable. The Host Name field refers to the IP Address or DNS hostname of the directory server. The Port field refers to the port value for the directory server. The Enable SSL field can be configured to consume SSL, but may require SSL initial configuration. The Secure Port field refers to the secure port value when SSL is enabled. The Search Root field refers to the directory root. The Search Subcontainers field provides three options: Base, One, and All. Base specifies that the scope of a search includes only the base distinguished name, One specifies that the scope of a search includes only the entries one level below the base DN, and All specifies that the scope of a search includes the base DN and all entries at all levels beneath that base.

Continuing with the various fields 134, the Max Search Entries field sets the maximum number of search results returned on any given search in the directory browser. The Proxy User Name field sets the search proxy DN, and the Proxy Password fields sets the search proxy password. By leaving the Proxy User Name and associated Proxy Password blank, anonymous credentials will be used on directory queries. The Authentication Group field specifies if the directory is a member of the Authentication Group. The Authentication User Name field only applies to a Login Server and refers to the Authentication Proxy DN. This Authentication User will be responsible for searching and identifying fully DN's during contextless login based on the LOGINKEY mapped attribute. Therefore, the authentication proxy will have read access to all DN's and the LOGINKEY mapped attribute in the Login Server. A "user not found" error will be encountered on login attempt if the Authentication User does not have read access to these specified fields. By leaving Authentication User Name and the associated password field blank, the directory shell will assume anonymous credentials on all contextless login attempts. Likewise, the fields Authentication Password and Authentication Search Root only apply to Login Servers only, and refer respectively to the password in conjunction with Authentication User Name specified above and the container of where Authentication Credentials search is to begin.

The LDAP Settings view 130 includes two buttons 136. The Save button saves any changes made to the fields 134. The Refresh Schema button will merge new schema information with existing settings for this directory.

Figure 6:
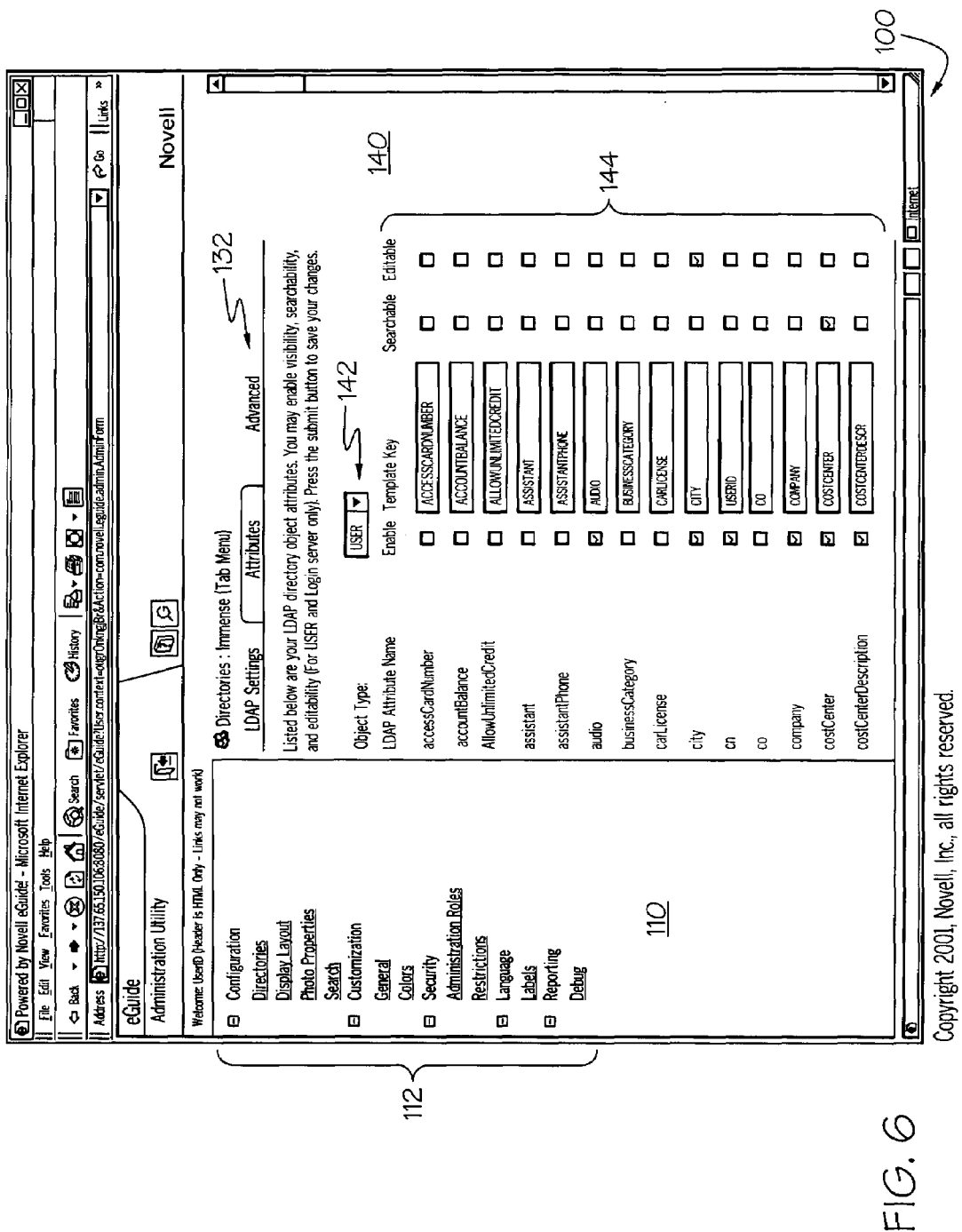
FIG. 6 depicts an example of a screen shot of an attributes tab for the directories option of an administration utility.

Turning now to FIG. 6, an example of an Attributes view 140 corresponding to the Attributes tab 132 is displayed. This detailed panel 140 allows an administrator to select any defined ObjectScheme object from the Object Type pull-down field 142. A comprehensive list of category attributes for the directory populates the table 144. From this table 144, an administrator may define mappings and settings for the AttributeScheme objects for the selected ObjectScheme object. The Enabled column in the table 144 selects whether the class attribute is useable, which simply means the attribute data of this class attribute will be returned from a search of the directory. A directory read will occur when the detailed panel is requested by clicking on a search button in the directory browser. The Template Key column is the assigned key-name given to each class attribute. Since different directories potentially have different names for class attributes, the key-name is the mechanism for the directory shell to treat these differing class attributes the same across multiple directory types. The Searchable column designates an class attribute as "Searchable" in the directory browser. The Editable column designates an class attribute as "Editable" from the directory browser.

Figure 7:
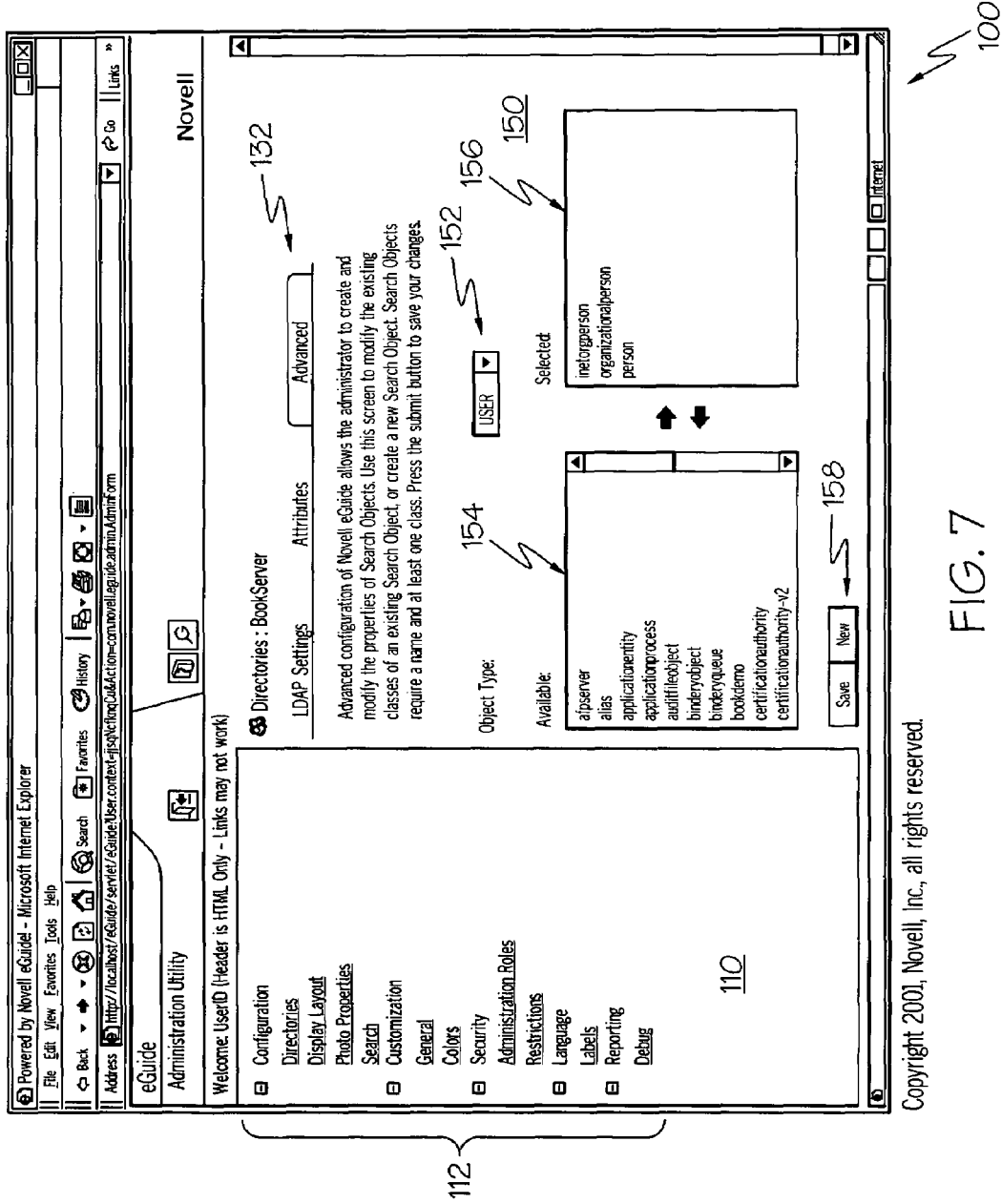
FIG. 7 depicts an example of a screen shot of an advanced tab of the directories option for the directories option of an administration utility.

Turning now to FIG. 7, an example of the Advanced view 150 corresponding to the Advanced tab 132 is displayed. From the Advanced view 150, an administrator has the option of editing existing categories, removing existing categories, or creating new categories. Each ObjectScheme object or category is a collection of directory classes that have been grouped together under one category name. In other words, any given category can reference or represent one or more classes of objects in a directory. An administrator selects any defined ObjectScheme object from the Object Type pull-down field 152. The Available list 154 is a dynamic list of all available directory classes from the selected directory. The administrator can select or group any of these available classes together into the Selected list 156 for the category identified in the field 152. Likewise, directory class in the Selected list 156 may be removed. In the present example, the category USER references and represents Inetorgperson, Organizationalperson, and Person directory classes. When the Save button 158 is pressed, a table of combined directory class for this category will be updated to reflect the new collection of directory classes under this category. Selecting the New button allows for the creation of a new category.

Continuing with the options in the options panel 110, the Display Layout option 112 allows an administrator to configure the display of one or more ObjectScheme objects. Selecting the Display Layout will present a new details panel of the page 100, which includes three table views: Search Form, List Form, and Details Form. In a "Search Form" tab view, an administrator may specify the order of category attributes that have been specified as "Searchable" in the Attributes view 140 for the selected category. The item selected as the top of this list will be the default "Filter" selection from the directory browser when this category is selected. In a "List Form" tab view, an administrator may designate specific category attributes that will appear in the list panel of the directory browser. Preferably, only those attributes that have been previously designated as "Enabled" in the Attributes view 140 of this category will be available. In the "Details Form" tab view, an administrator may designate ordering of category attributes to be displayed in the details panel of the directory browser. All attributes tagged as "Enabled" from the Attributes view 140 of this category will show up in this list and be rendered according to the saved order value.

The Photos Properties option 112 configures the use of photographs in directory shell. The user may specify where image files are stored, such as on a directory or on a file system, the maximum image size, whether a photo agreement is required, and whether users are allowed to upload images.

The Search option 112 allows an administrator to specify the number of default search rows to start with and the number of search rows to be displayed when a search is requested from the directory browser. Further, an administrator can specify which search criteria will be displayed in the directory browser. Examples of search criteria include: contains, does not contain, does not end with, does not equal, does not start with, ends with, equals, and starts with.

The General option 112 allows an administrator to select from different user interface themes and specify the URL for the default "Home" link for the directory browser. A toggle allows authenticated users or User Administrators to go right into the Modify form when the details panel of the directory browser is requested and edit rights are ascertained. Further a toggle enables an authenticated user to modify her own "Editable" attributes in the directory browser. The Colors option 112 allows the administrator to choose a color scheme for the user interface.

The Administrator Roles option 112 configures administrative roles for users of the directory shell. For instance, user administrators can be assigned to modify access to all "Editable" attributes that belong to other directory users in the Authentication Group. When a self-administration option is enabled and the user is authenticated, users can modify their own "Editable" attributes. The user administrator always has rights to modify other user's "Editable" attributes regardless of whether self-administration is enabled or not. User administrators receive edit privileges on all category attributes that: 1) have attributes designated as "Editable" from the Attributes view 140, 2) reside in the Login Server of the Authentication Group, or 3) directory "write" privileges have been granted to the user in question. User administrators also have an additional edit-mode "Browse" feature to manage org-chart or manager information. This browse feature will show a browse icon next to the manager DN attribute of all Authentication Group USERS, which allow manager searching and convenient insertion of the matching DN in the Manager field.

The Restrictions option 112 configures whether validated credentials will be stored on the client machine in a cookie using Base64 encryption. Subsequent loading of the directory shell will automatically authenticate the client with the credentials stored in the cookie. An administrator can also specify how many seconds until the cookie (if enabled and exists) will expire. Further, an administrator can specify whether directory authentication is required prior to the directory browser being available.

The Labels option 112 enables the administrator to configure the text of labels for AttributeScheme objects that will be presented in the list panel and details panel of the directory browser. Instead of presenting a somewhat cryptic class attribute name found in the directory, the administrator can configure the label to be more recognizable to a user. For instance, a class attribute may be "CELLPHONEEMAIL" and the corresponding text label may be "Cell eMail."

The Debug option 112 allows the administrator to enable diagnostic information to be written to a log file associate with a session, as well as configure the type of debugging information that the administrator desires to be written.

Figure 8:
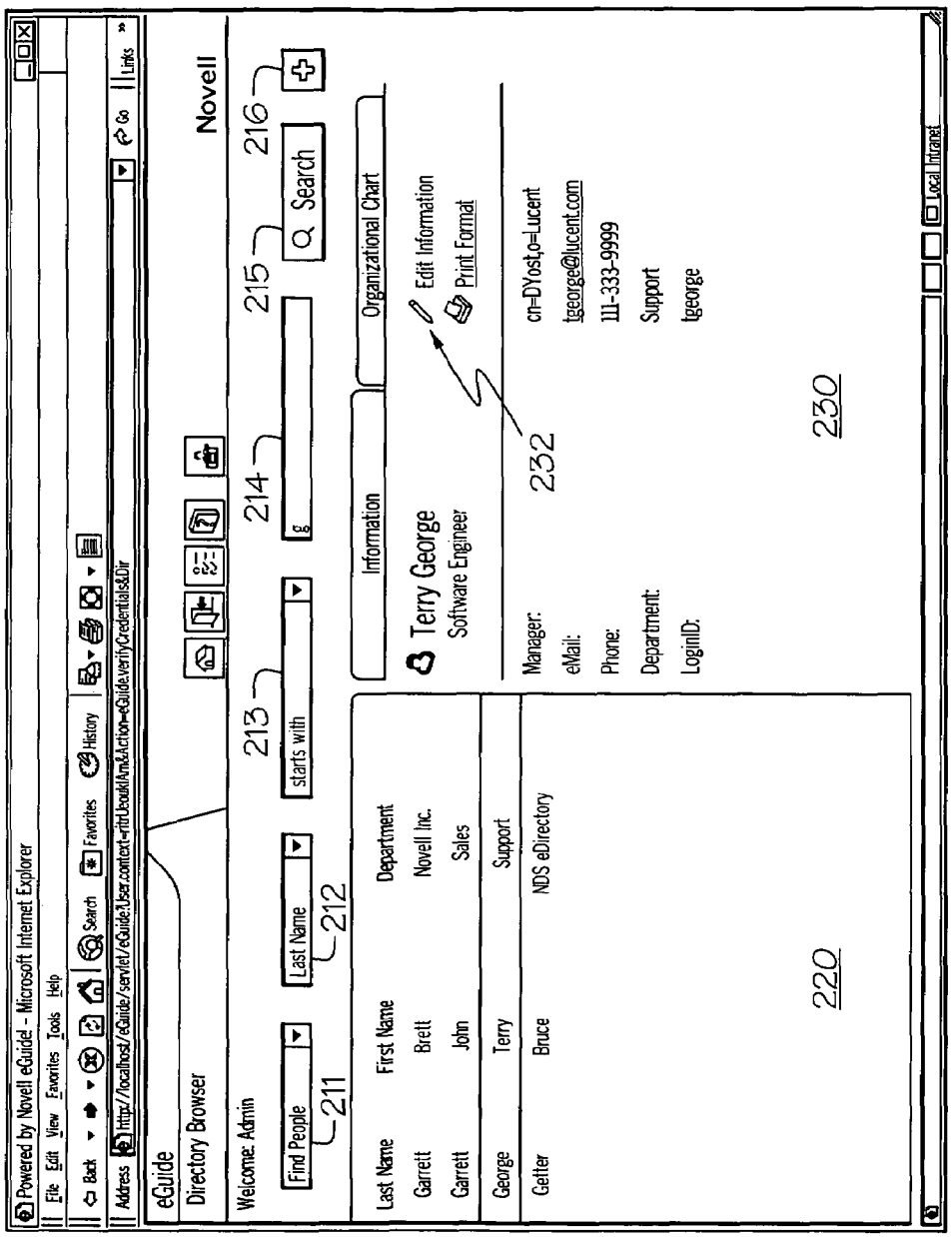
FIG. 8 depicts an example of a screen shot of a directory browser.

FIG. 8 illustrates an example of a page associated with a directory browser or client. As shown in this example, the page 200 generally comprises three portions: a query portion 210, an list panel 220, and a details panel 230. The query portion 210 comprises a variety of input options to format a query. The category input 211 in this example is a pull-down list of the various ObjectScheme objects, thus allowing a user to select a category or search object against which a query is directed. The attribute input 212 in this example is a pull-down list of the various AttributeScheme objects that have been identified as "Searchable" in the Search Form tab of the Display Layout option 112. Accordingly, a user may select a category attribute against which a query is directed. The criteria input 213 in this example is a pull-down list of different search criteria, which conform to the criteria selected under the Search option 112. The data input 214 in this example is an edit field that can accept alphanumeric string (sometimes referred to as query data) that will be the subject of the query. In the present example, the query format based on the values entered in the various fields 211, 212, 213, and 214 is a query against the "Last Name" category attribute of the "Find People" category that starts with the character "g". The Boolean expansion button 216, shown here as a "+" allows the user to format a Boolean query, which is described in greater detail below.

The search button 215 will format and submit a search request to the directories in accordance the query format provided by the user in the various inputs 211, 212, 213, and 214. For instance the search request to the directory will be directed to the classes of objects and associated attributes that correspond to the respective category and category attributes elected in the inputs 211 and 212. In the present example, query format is converted into a directory packet request, such as an LDAP packet request, which will preferably be multi-threaded. The packet request is submitted to the appropriate directories, which will respond with a return packet with directory data. The return packet is converted into XML format, and then the XML data is rendered with an XSL style sheet to create WML or HTML pages depending upon the device. The new HTML page is then served to the user's HTML browser to populate the list panel 220 and the details panel 230 with the search results.

The list panel 220 presents a listing of the various directory objects satisfying the query. The presentation format of each object is configured in accordance with the administrator's selection in the List Form tab view of the Display Layout option 112. In the present example, four directory objects satisfied the query and the listed category attributes are First Name, Last Name, and Department. The details panel 230 lists a more detailed information regarding the directory object selected in the list panel 220. The category attributes and data listed in the details panel 230 are configured in the Details Form tab of the Display Layout option 112. Upon selecting the Edit link 232, assuming the user has rights to edit values in the directory, a modify screen will be present, such as that depicted in FIG. 9.

Figure 9:
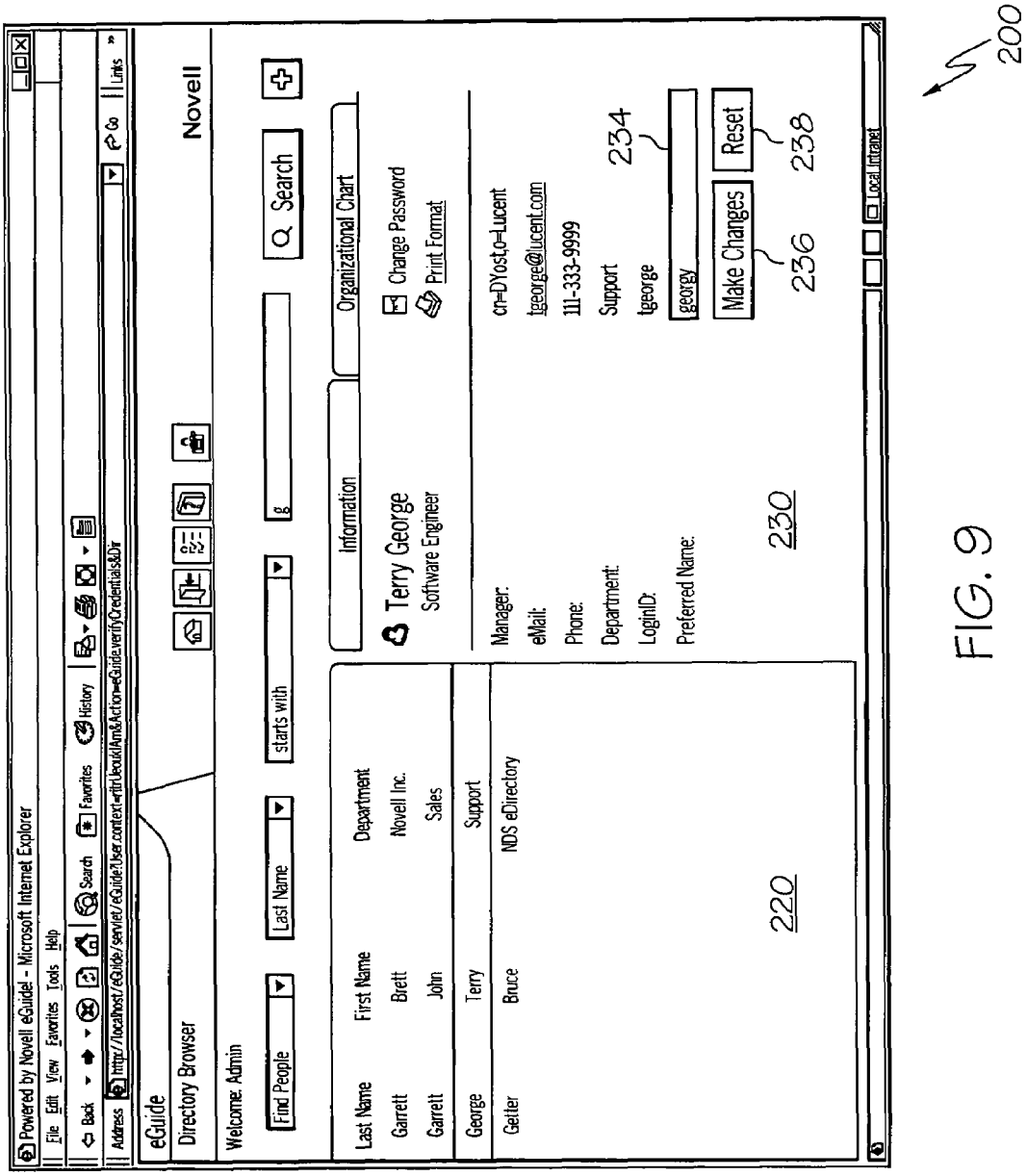
FIG. 9 depicts an example of a screen shot of a directory browser in a modify mode.

FIG. 9 depicts another example of the directory browser page 200. In this example, the details panel 230 is presented as a Modify form. For instance, the value associated with the AttributeScheme object Preferred Name is presented in an edit field 234. The Modify form is presented when the user has appropriate right to modify value in the directory. Further, edit fields 234 are presented when the corresponding AttributeScheme object has been configured as "Editable". Upon selecting the Make Changes button 236, the changes to the values are modified in the corresponding direct Attributes in the directory. The reset button 238 returns the edit field 234 to the current value in the directory.

Figure 10:
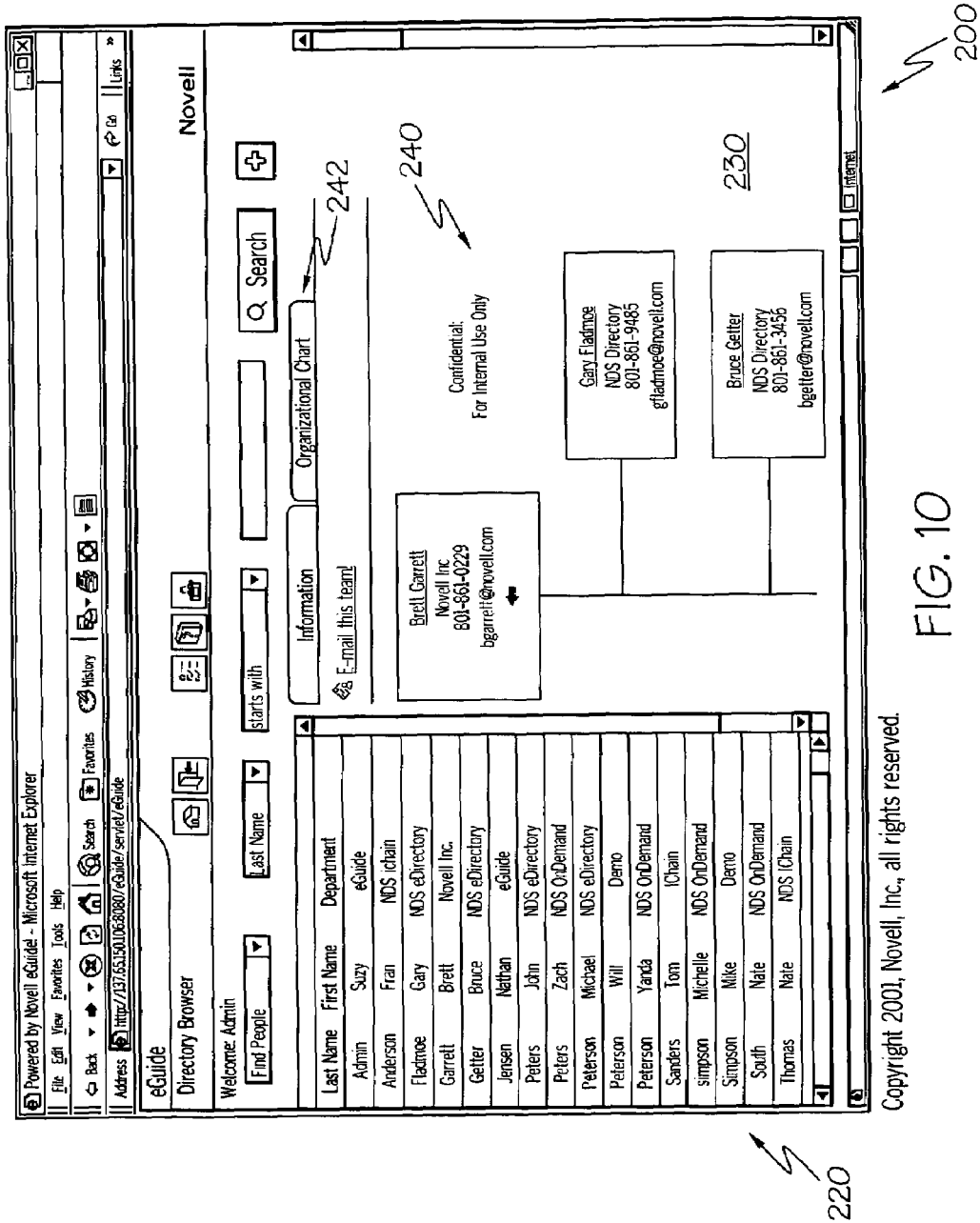
FIG. 10 depicts an example of a screen shot of a directory browser which includes an organizational chart.

FIG. 10 illustrates another example of the directory browser page 200. In the present example, the details panel 230 displays the objects selected from the list panel 220 in the form of a graphical organizational chart 240. Optionally, an Organization Chart tab 242 is also presented so that the user can toggle between the chart view and the view provided under the information tab, as shown in FIGS. 8 and 9.

Figure 11:
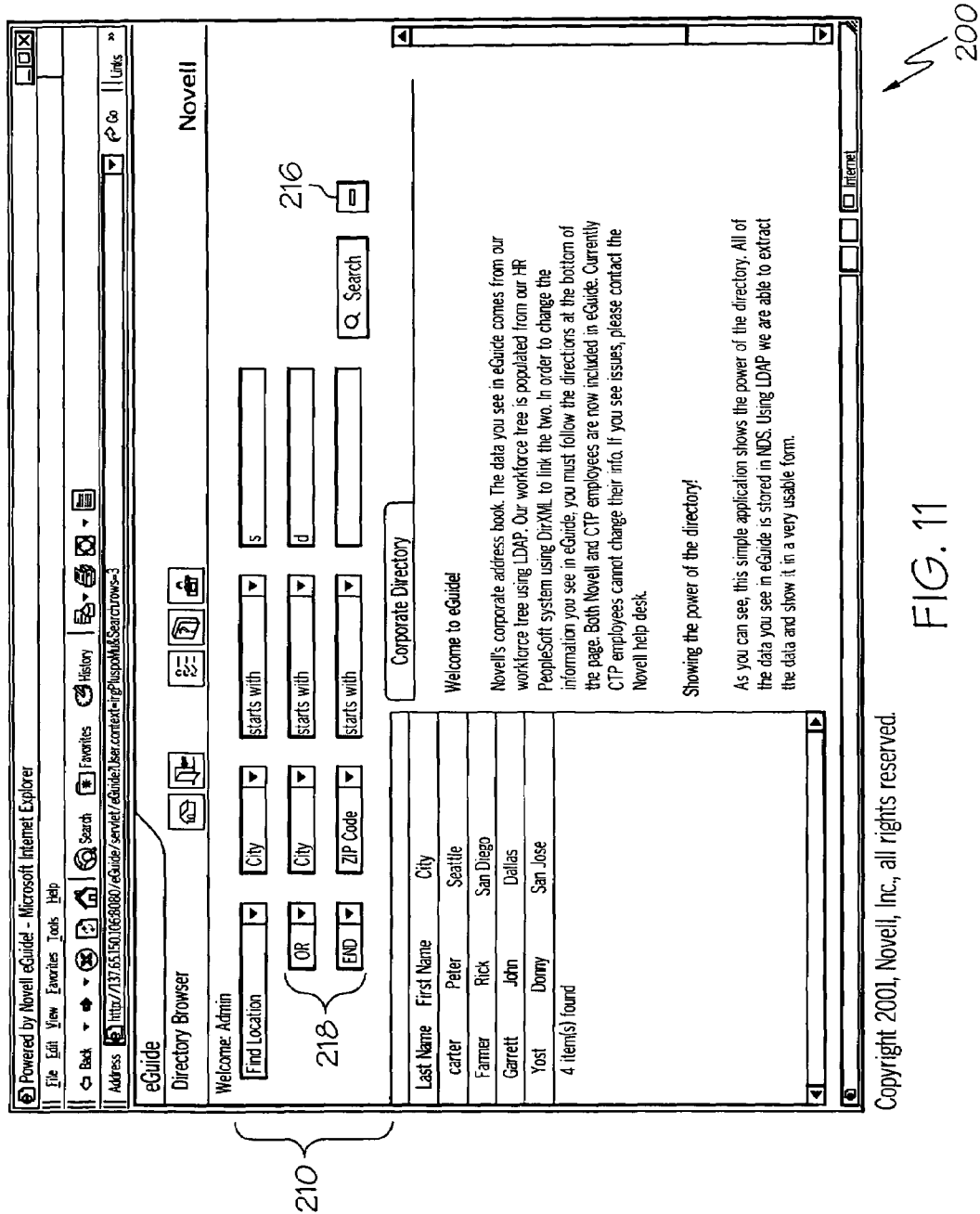
FIG. 11 depicts an example of a screen shot of a directory browser with a Boolean query format.
Figure 8:
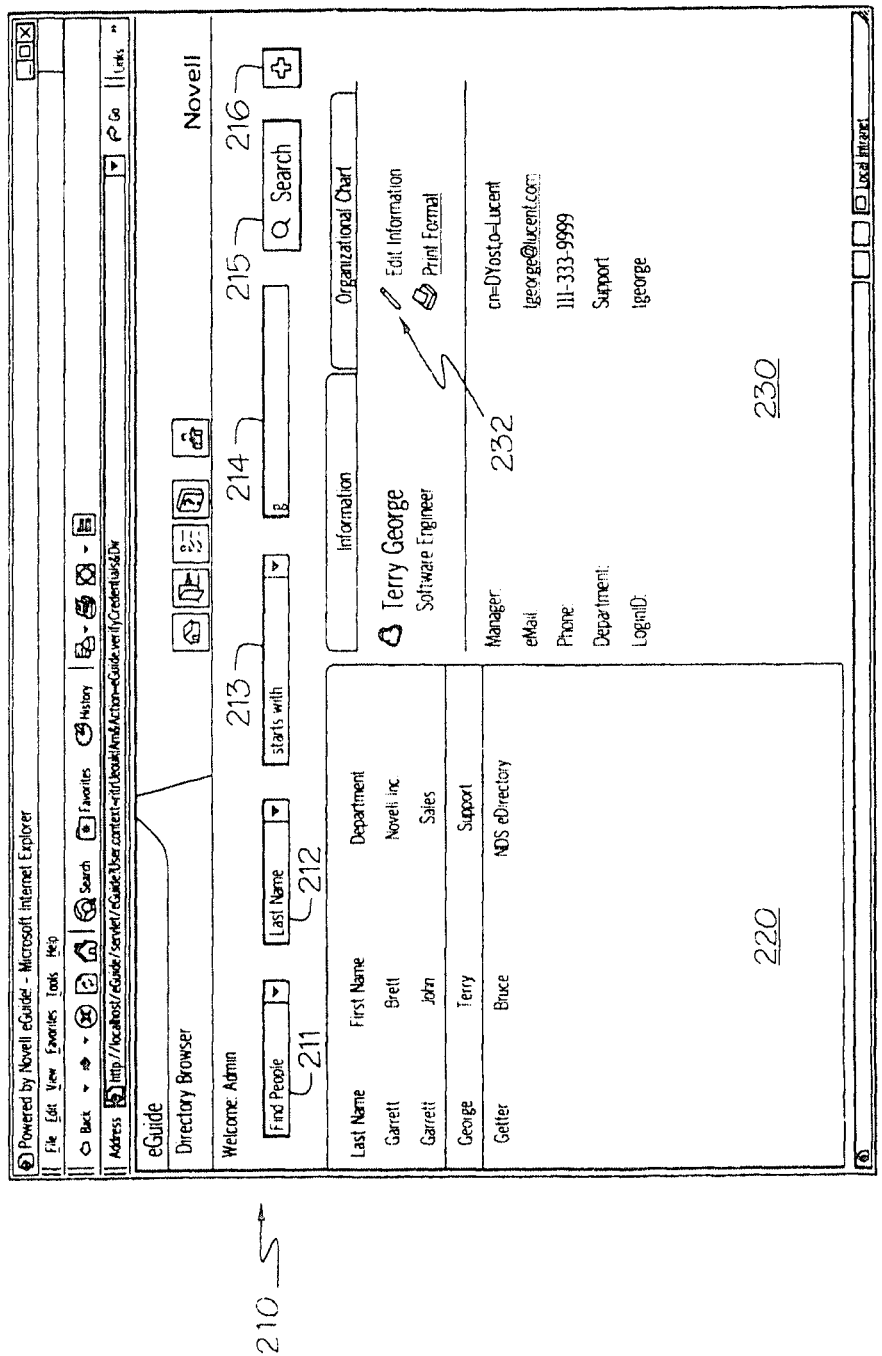

FIG. 11 illustrates another example of the directory browser page 200. In the present example, the query portion 210 has been expanded to format Boolean queries. The Boolean inputs 218 in this example are pull-down lists containing standard Boolean operators. The Boolean expansion button 216, shown here as a "−" may be selected to eliminate the Boolean format.

The foregoing description and examples of the invention have been presented for purposes of illustration and description. These are not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the appended claims.

We claim:

1. A computer program product available on a computer readable medium having computer executable instructions for loading on a computing device, comprising:
    a directory shell able to reference two or more disparate directories each having a directory class, the directory class in one of the directories being dissimilar in directory objects and data from the directory class in another of the directories;
    an administrator utility with the directory shell configurable to associate the directory class in the one of the directories to the directory class in the another of the directories, the result of associating the directory classes being a user-searchable category including a category attribute mapped to one or more class attributes of the directory class; and
    a directory browser with the directory shell whereby users can search the directory classes of the two or more disparate directories with a single query of the user-searchable category, including a panel where users can view search results of the single query.

2. The computer program product of claim 1, wherein the two or more disparate directories are managed on a plurality of servers in communication with the computing device onto which the directory shell is loaded.

3. The computer program product of claim 1, further including a directory interface operable to send the single query to the two or more disparate directories.

4. The computer program product of claim 3, further including a director driver for each of the two or more disparate directories to allow the directory interface to communicate therewith.

5. The computer program product of claim 1, wherein the administrator utility further includes a table for associating the directory class in the one of the directories to the directory class in the another of the directories.

6. A method of searching in a computer system, comprising:
providing a directory shell with an administrator utility and a directory browser for loading onto a computer;
enabling the administrator utility to associate directory classes of two or more disparate directories into a single user-searchable category, including enabling mapping a category attribute to one or more class attributes of one of the directory classes;
from the directory browser, enabling direct searching of the directory classes of the two or more disparate directories with a single query of the single user-searchable category; and
causing displaying of search results of the single query on a panel of the directory browser.

7. The method of claim 6, wherein the enabling further includes mapping a category attribute of the single user-searchable category to one or more class attributes of the directory class.

8. A computer program product available on a computer readable medium having computer executable instructions for loading on a computing device, comprising:
a directory shell for loading on the computing device which is in communication with one or more servers having two or more disparate directories each with a directory class, the directory class in one of the directories being dissimilar in directory objects and data from the directory class in another of the directories, the directory shell having an administrator utility and a directory browser;
a table in the administrator utility configurable to associate the directory class in the one of the directories to the directory class in the another of the directories, the result of associating the directory classes being a user-searchable category including a category attribute mapped to one or more class attributes of the directory class, the table having an enable column to indicate directory classes associated with the user-searchable category;
a query portion in the directory browser whereby users can directly search the directory classes of the two or more disparate directories with a single query of the user-searchable category; and
a panel in the directory browser where users can view search results of the single query.

9. The computer program product of claim 8, wherein the query portion and the panel are on a same page of the directory browser.

10. The computer program product of claim 8, wherein the table includes one or more check boxes for the associating of the directory classes.

11. The computer program product of claim 8, wherein the administrator utility and directory browser is formatted to be displayed in HTML format.

12. A method of searching in a computer system, comprising:
creating a single user-searchable category from directory classes of two or more disparate directories, the creating including mapping a category attribute to one or more class attributes of one of the directory classes and indicating the directory classes associated with the user-searchable category by way of an enable column; and
directly searching the directory classes of the two or more disparate directories with a single query of the user-searchable category, the directly searching substantially avoiding creating or using a virtual or other directory.

13. The method of claim 12, wherein the creating further includes associating, in an administrator utility, the directory class in the one of the directories to the directory class in the another of the directories.

14. The method of claim 12, wherein the creating further includes creating additional user-searchable categories for additional directory classes of the two or more directories.

15. The method of claim 12, wherein the creating further includes providing a directory shell for loading on a computer in communication with one or more servers having the two or more disparate directories.

* * * * *

UNITED STATES PATENT AND TRADEMARK OFFICE
CERTIFICATE OF CORRECTION

| | | |
|---|---|---|
| PATENT NO. | : 7,519,575 B1 | Page 1 of 2 |
| APPLICATION NO. | : 09/943786 | |
| DATED | : April 14, 2009 | |
| INVENTOR(S) | : Simpson et al. | |

It is certified that error appears in the above-identified patent and that said Letters Patent is hereby corrected as shown below:

In the drawings, Fig. 8, the reference numeral "100" should read -- 200 --.

In the drawings, Fig. 8, the reference numeral -- 210 -- should be added to identify the query portion of the page 200:

Signed and Sealed this

Fifteenth Day of June, 2010

David J. Kappos
*Director of the United States Patent and Trademark Office*